Dec. 27, 1927.
G. S. SERGEANT
EDGER
Filed Dec. 10, 1924
1,654,435
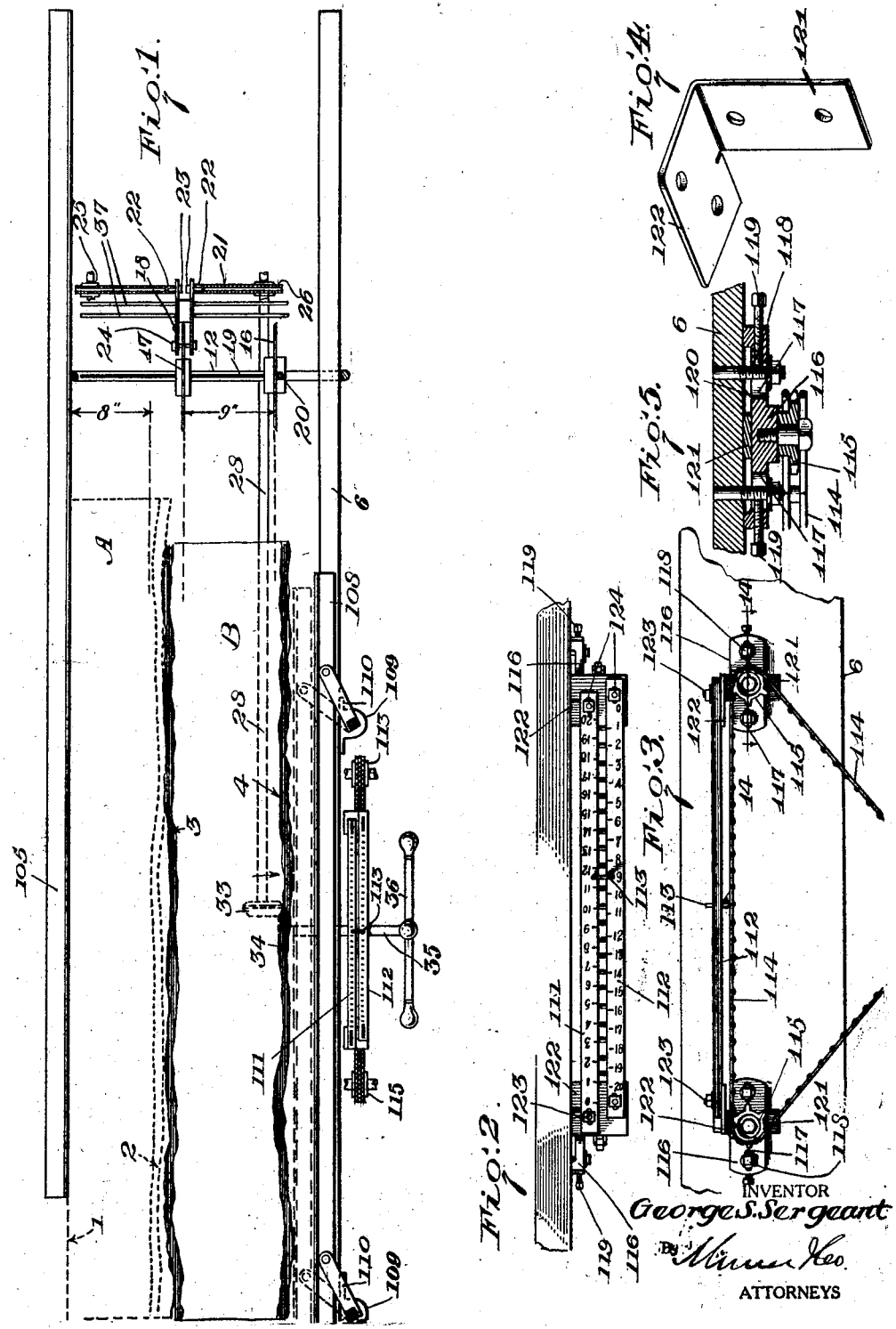
INVENTOR
George S. Sergeant
ATTORNEYS Patented Dec. 27, 1927.

1,654,435

UNITED STATES PATENT OFFICE.

GEORGE S. SERGEANT, OF GREENSBORO, NORTH CAROLINA.

EDGER.

Application filed December 10, 1924. Serial No. 755,028.

This invention relates to improvements in machines for edging lumber, an object of the invention being to provide a machine for trimming either one or both bark edges of a board as it comes from the saw mill, and an improved gauging means and control for regulating the position of the movable saw.

Figure 1 is a diagram illustrating the action of the gauging mechanism.

Figure 2 is a detail plan view of the gauge scale.

Figure 3 is a detail side elevation of the gauge control.

Figure 4 is a detail perspective view of one of the gauge controls.

Figure 5 is a detail cross section on the line 14—14 of Figure 3.

It is the purpose of the invention to provide a machine for trimming one or both bark edges of a board as it comes from the saw mill. As is commonly known, it is the purpose of a saw mill to cut a log into planks or boards.

The sawyer will sometimes run a log through the first time in order to remove a bark slab at one side in order to produce a flat place upon which to lay the log and keep it from rolling off of the saw mill carriage. The log is then turned 90° upon the carriage in order to take advantage of the flat face.

At other times the sawyer will simply run the log through to cut off the successive boards, suitable chocks being then employed to keep the log from rolling off. In the first instance the board sawed off of the log will have a trimmed edge 1 (Fig. 1) and a bark edge 2. The board A, upon which these edges occur is referred to later. In the second instance the board B will have two bark edges 3 and 4.

In either case it is necessary to trim off a bark edge. There are machines for the purpose, but the fundamental defect of all known machines is that they do not keep the board true with sufficient accuracy and positiveness to prevent a curvature of the cut known in sawmill parlance as a rainbow. The improvement herein disclosed is directed especially to the indexing mechanism by which the position of the movable saw which does the foregoing trimming is controlled.

Appropriately journaled upon a suitable framework such as 6 is the saw arbor 12.

The arbor 12 carries two circular saws 16 and 17, the first being fixed but the second being slidable along the arbor by means of a fork 18 (Fig. 1). The arbor has a longitudinal groove 19. The saw 16 is fixed by means of a key in the groove (not shown) and a set screw 20. The saw 17 has a key (not shown) occupying the groove 19, causing rotation of the saw but permitting the sliding movement spoken of.

An endless chain 21 has connection at hooks 22 with the fork 18 so that upon movement of the chain the saw 17 is caused to slide upon the arbor. The hooks are adjustable at 23 to take up slack in the chain. The forks have suitable wood pins 24 which bear against the sides of the saw. These, in practice, are confined by set screws. An arrangement of three sprockets carries the chains 21, two of these, namely 25 and 26, being shown.

A shaft 28 (Fig. 1) carries the third sprocket (not shown) and operates the chain 21, turning of the shaft 28 causing movement of the chain and of the saw 17. Meshing beveled gears 33 and 34 impart motion from the hand wheel shaft 35 to the operator shaft 28. The former shaft carries a hand wheel 36 which, upon being turned either to the right or left, will produce the sliding motion of the saw spoken of. It is important to notice that the hand wheel 36 is situated at the side of the framework 6. This places the operator or sawyer in a substantially central position from which he can well observe the operation of the machine, and can also place the boards to better advantage upon the edger.

A pair of rods 37 provide the mounting upon which the fork 18 slides. These rods are obviously parallel, as shown in Figure 1. The ends of the rods are suitably mounted in the framework in order to provide a rigid support. Driving of the saws is accomplished by a belt (not shown) which is suitably applied to the arbor 12.

A gauge bar 105 provides for laying a board A straight upon the machine bed and in alignment with the saw 17. Use is made of the gauge bar 105 when the board has a previously trimmed edge 1. The bar 105 is fixed by means of suitable brackets (not shown) and extends the full length of the framework.

An aligning bar 108 provides for properly positioning a board B in respect to both saws 16 and 17. It is mounted upon bearings 109 (Fig. 1) by means of links 110, permitting a parallel motion of the aligning bar in respect to the side of the framework and to a right angle drawn in respect to the saw arbor 12. The bar 108 is used only to align the board in respect to the saws, use being made of the aforesaid parallel motion, and after the board has been properly aligned the bar is withdrawn to the near side of the frame and serves no further purpose.

Turning of the hand wheel 36 causes the sliding of the saw 17 upon the arbor 12. It is necessary for the sawyer to know where the saw 17 stands. The graduations on the back scale bar 111 (Fig. 1) indicate the distance in inches that the saw 17 is situated from the gauge bar 105. The graduations on the front bar 112 designate the distance that the saw 17 is situated from the stationary saw 16. The scale bars are spaced apart to provide passage for the shank of the pointer 113 in reference to which both scales are readable.

The pointer 113 is carried by a chain 114 running over sprockets which are so situated as to define a substantial triangle, two of the sprockets being shown in Figure 3 and are designated 115. It is the upper and horizontal strand of the chain that carries the pointer 113, this strand running in parallelism with the scale bars. The lowermost sprocket (not shown) is carried by the control shaft 35. The other two sprockets are mounted upon bearing blocks 116 (Figs. 3 and 5). These are slotted at 117 to receive securing bolts 118. The nuts of these bolts can be loosened, and use is then made of set screws 119 to adjust the bearing blocks in either direction to take up or loosen the chain 114.

A groove 120 (Fig. 5) produced by the formation of the bearing block 115, provides room for the shank 121 (Figs. 3 and 4) of a bracket 122 upon which one end of each of the bars 111—112 is secured at 123. The scale bars are slotted at 124 to provide such adjustment of the scale bars as may be necessary to secure proper registration between the pointer 113 and the graduations on the scale bars for given positions of the movable saw 17. The structure in the description immediately preceding is duplicated at the other extremity of the bars, two bearing blocks, etc., being necessary to properly support the scale bars.

The operation.

The driving of the stationary and slidable saws 16 and 17 is continuous.

As soon as a board is cut from the log on the carriage of a saw mill it may be picked up by the sawyer and placed upon the framework of the edger. The board thus picked up is generally either one having a previously trimmed edge 1 (Fig. 1) and a remaining bark edge 2, or one which has the original bark edges 3 and 4. These kinds of boards are produced by either first sawing a slab from the log in order to provide a flat resting place therefor upon the carriage of the saw mill, or leaving the log in its original state.

Assume that the board A (Fig. 1) of the first variety is placed upon the machine. The board is moved over until the previously trimmed edge 1 abuts the gauge bar 105. This bar is fixed upon the main frame. The bark edge 2 usually is uneven, but by experience the sawyer can judge the width of plank that can be gotten out of the board by merely looking at it. Assuming that he decides upon an 8″ board he turns the hand wheel 36 until the pointer 113 stops opposite to the graduation "8" on the back scale bar 111.

This act causes the sliding of the saw 17 along the arbor 12 until it stops at a place 8″ from the bar 105 (Fig. 1). The movement of the saw 17 is accomplished by the fork 18 and the series of driving connections which end at the hand wheel 36. The edger is now operated to feed the board "A" toward and past the saw 17. At this time the saw 16 performs no function.

Assume next that a board B (Fig. 1) with double bark edges 3 and 4 is placed on the machine. It is now necessary to perform a double trimming operation simultaneously. Use is now made of the aligning bar 108. This bar is moved over upon the bed of the machine by the sawyer, the high spots or places on the bark edge 4 nearest the sawyer having first been brought into contact with the aligning bar.

The bar and board are now moved over until the sawyer sees that the saw 16 will clear the bark edge. He next appropriately turns the hand wheel 36 until the pointer 113 stops at that numeral on the front bar 112 designating the width of planks that in his judgment may be cut from the board. If he decides upon a 9″ board, he turns the hand wheel until the pointer stops at the numeral "9" on the front scale bar, and this will mean that the saw 17 has been slid to a point 9″ from the relatively stationary saw 16. The aligning bar 108 is now moved back to the original position inasmuch as it performs no function hereafter.

The edger is again operated so that the board B is fed toward the saws 16 and 17. Both bark edges 3 and 4 are taken off simultaneously.

It is a matter of great convenience to the sawyer that provision is made of a side control. This centralizes the sawyer's position both in respect to the saw mill (not shown) and to the edging machine. He has a more comprehensive view of the board than were he stationed at the left extremity of the machine, and he is enabled to judge the width dimensions more speedily and accurately. An experienced sawyer is very quick in judging board widths, and combined with his judgment it is only necessary that he watches the pointer 113 in respect to the gauge scale bars (Figs. 1 and 2) whereupon the saw 17 will take care of itself. The reading on the back bar 107 denotes the distance in inches that the movable saw 17 is situated from the fixed bar 105, and the reading on the front bar 112 denotes in inches the distance that the movable saw is situated from the fixed saw 16.

While the construction and arrangement of the improved board edging machine is that of a generally preferred form, obviously modifications and adaptations may be made without departing from the spirit of the invention or the scope of the claims.

I claim:—

1. In combination with the gauge bar, fixed saw and slidable saw of an edger, means to move the slidable saw in respect to the gauge bar and fixed saw including a hand wheel, a pointer, means for shifting the pointer in consonance with the turning of the hand wheel, said means including a driven chain and a pair of idler sprockets, bearing blocks carrying the idler sprockets, and scale bars between which the pointer is shiftable being independently and adjustably mounted upon the bearing blocks, said bars being respectively calibrated in inches to designate distances of the slidable saw both in respect to the gauge bar and the fixed saw.

2. An edger including spaced scale bars, a pointer traversing the space between the bars, a movable chain carrying the pointer, sprockets to which the chain is applied, bearing blocks for the sprockets each having a grooved side, means to adjust the bearing blocks to regulate the chain, and brackets to support the scale bars which having a shank occupying the space afforded by said block grooves permitting said adjustments of the blocks without interference by the shanks.

GEORGE S. SERGEANT.